(12) United States Patent
Riffel et al.

(10) Patent No.: US 8,616,139 B2
(45) Date of Patent: Dec. 31, 2013

(54) CULTIVATION AIR SEEDER WITH VISUALLY ENHANCED SEED HOPPER

(75) Inventors: Jacob R. Riffel, Salina, KS (US); Verne A. Hubalek, Lindsborg, KS (US)

(73) Assignee: Great Plains Manufacturing, Inc., Salina, KS (US)

(*) Notice: Subject to any disclaimer, the term of this patent is extended or adjusted under 35 U.S.C. 154(b) by 299 days.

(21) Appl. No.: 13/157,856

(22) Filed: Jun. 10, 2011

(65) Prior Publication Data

US 2012/0312210 A1  Dec. 13, 2012

(51) Int. Cl.
*A01C 7/18* (2006.01)

(52) U.S. Cl.
USPC .............................................. 111/63; 111/200

(58) Field of Classification Search
USPC .............................. 111/63, 174, 200; 460/119
See application file for complete search history.

(56) References Cited

U.S. PATENT DOCUMENTS

| | | | |
|---|---|---|---|
| 1,374,881 A * | 4/1921 | Copeland | 222/616 |
| 4,359,952 A * | 11/1982 | Gesior et al. | 111/52 |
| 6,308,645 B1 | 10/2001 | Newkirk et al. | |
| 6,688,245 B2 | 2/2004 | Juptner | |
| 7,018,290 B2 | 3/2006 | Ramon et al. | |
| 2003/0078085 A1 | 4/2003 | Gerber et al. | |

OTHER PUBLICATIONS

International Search Report and Written Opinion for PCT Patent Application No. PCT/US2012/041116, filed Jun. 6, 2012; Mailed: Dec. 26, 2012; 9 pages.

* cited by examiner

*Primary Examiner* — Alicia Torres
(74) *Attorney, Agent, or Firm* — Hovey Williams LLP

(57) ABSTRACT

A cultivation air seeder has an ornamental facing around three sides of its large, metallic bulk seed hopper to enhance the appearance of the hopper and provide environmental protection for sensitive mechanical, electronic and hydraulic components. A front section of one facing panel on each side of the machine is hinged about a generally upright axis to allow the panel section to be opened and closed like a door for operator access to the components behind it. The facing can be stylishly molded from a synthetic resinous material or other non-metallic substance to facilitate manufacture and is disposed to conceal unsightly weld lines and other imperfections on the exterior surface of the hopper.

33 Claims, 16 Drawing Sheets

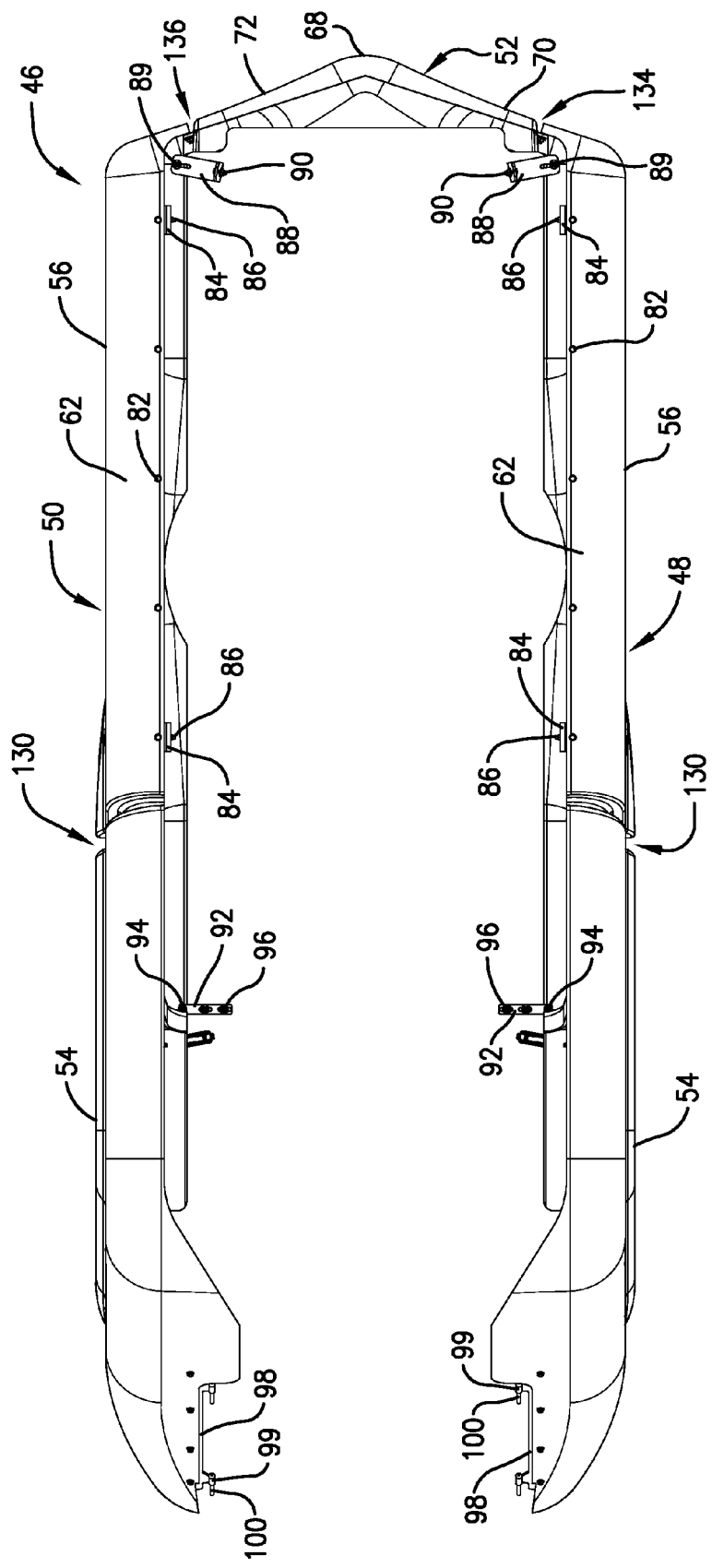

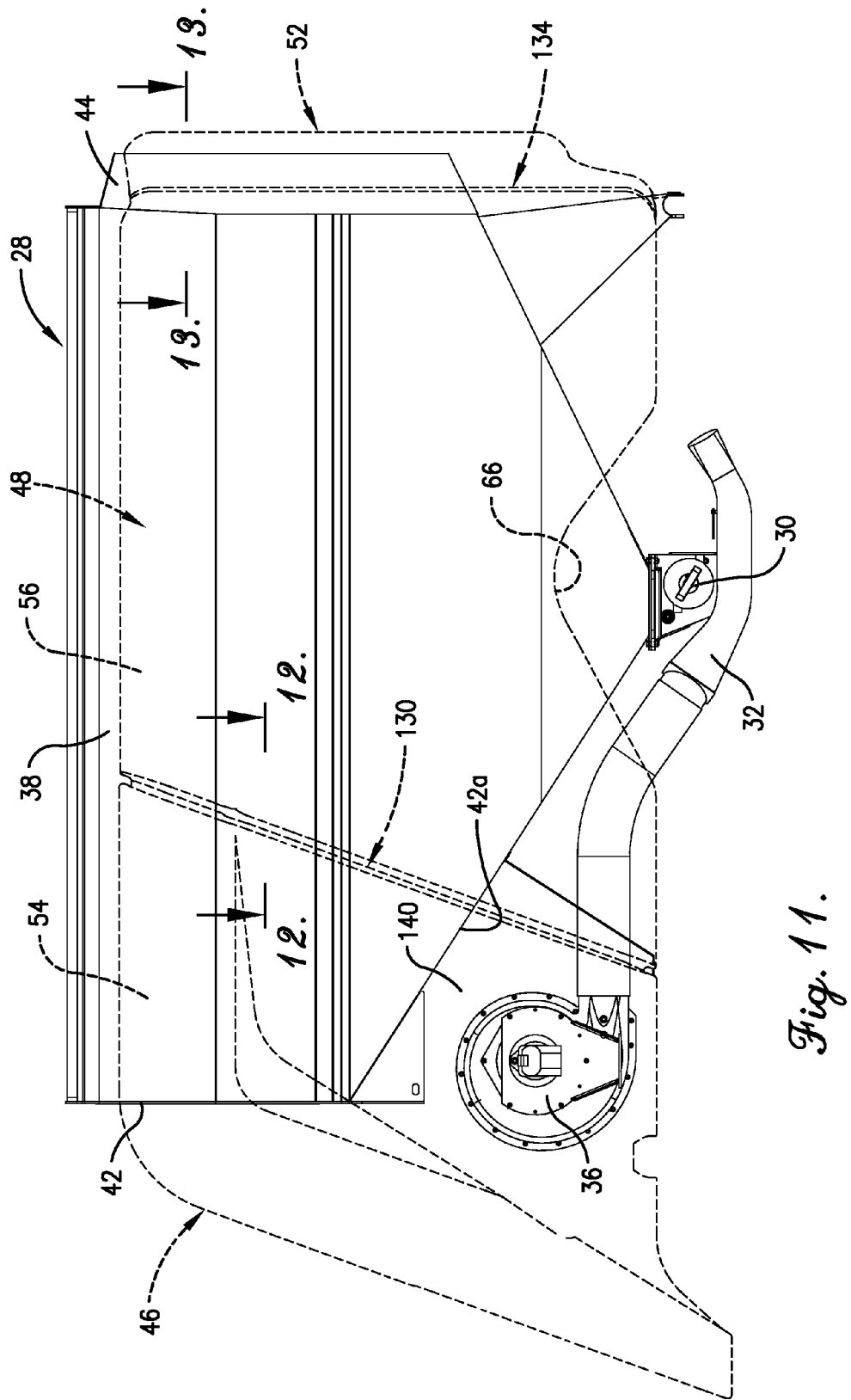

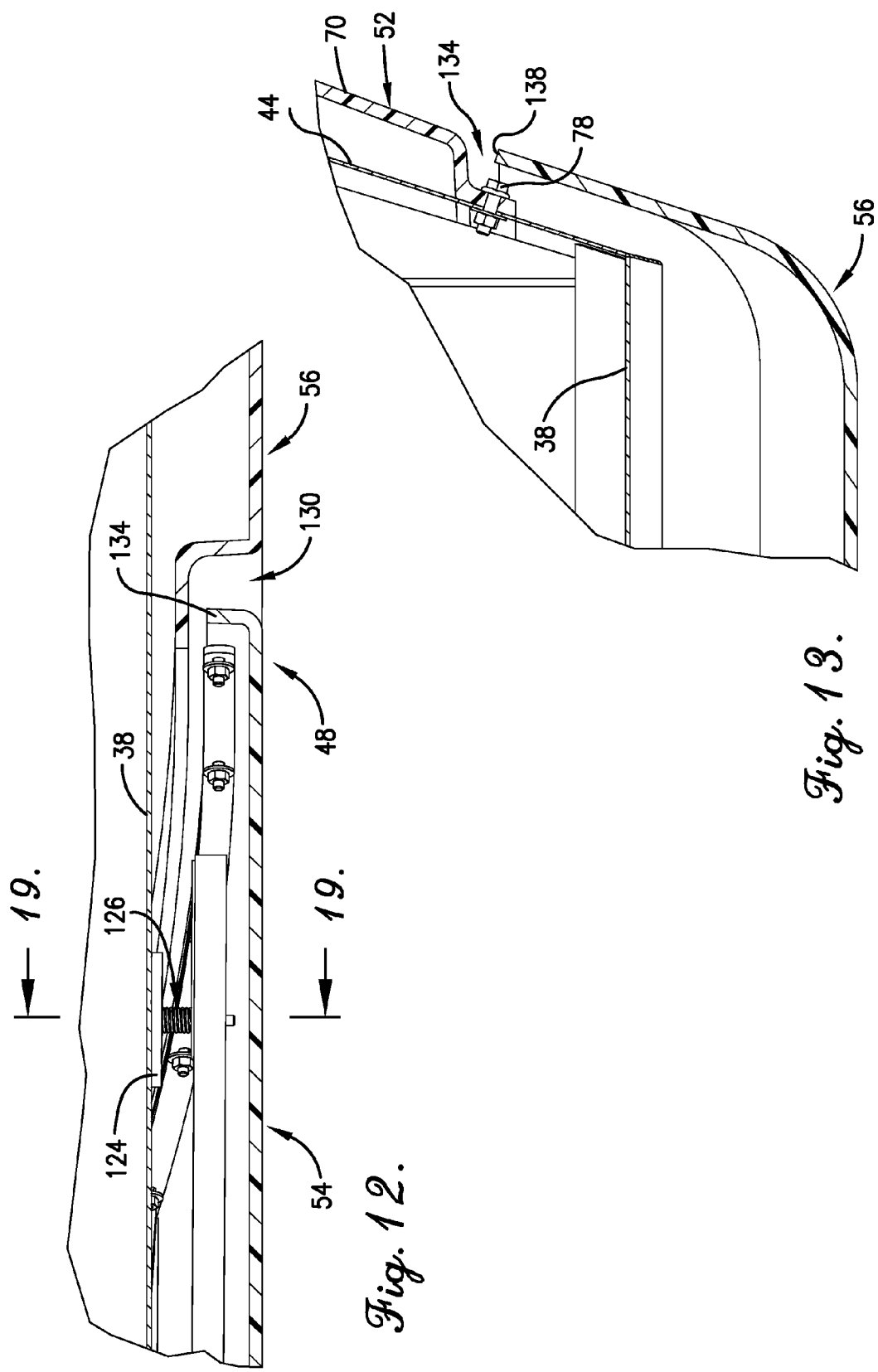

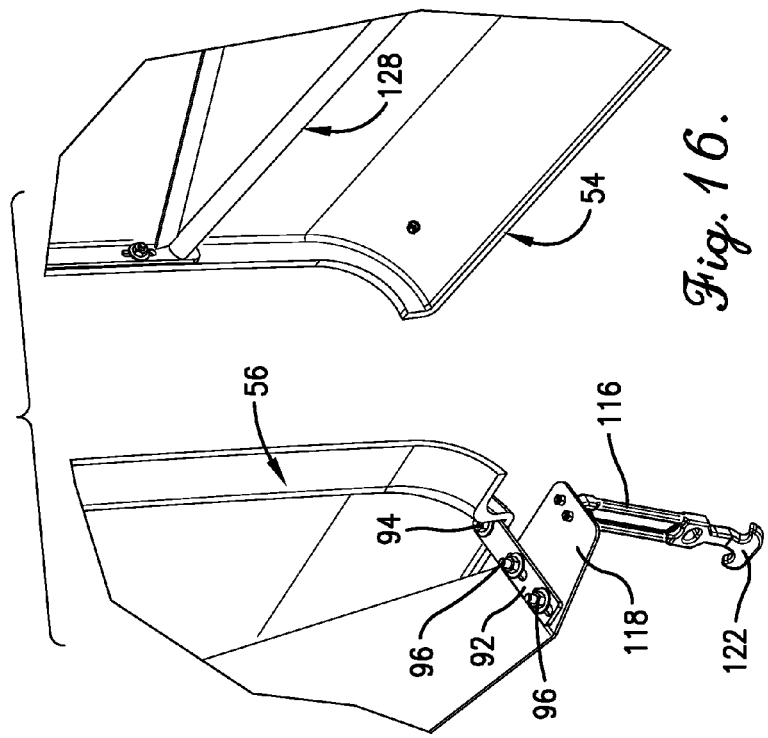
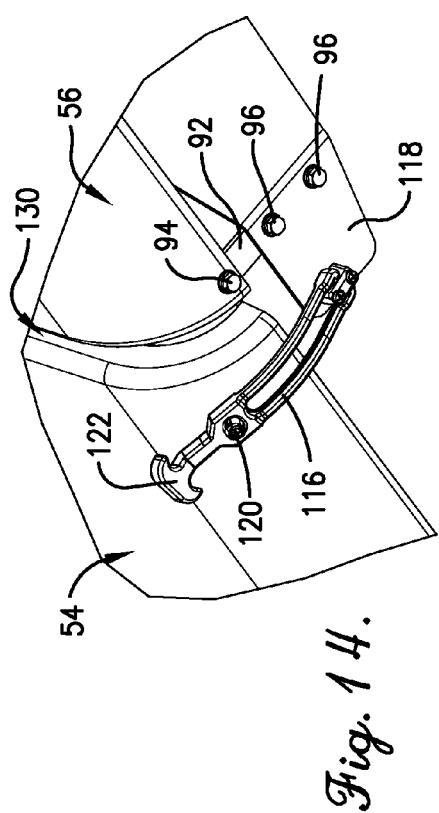
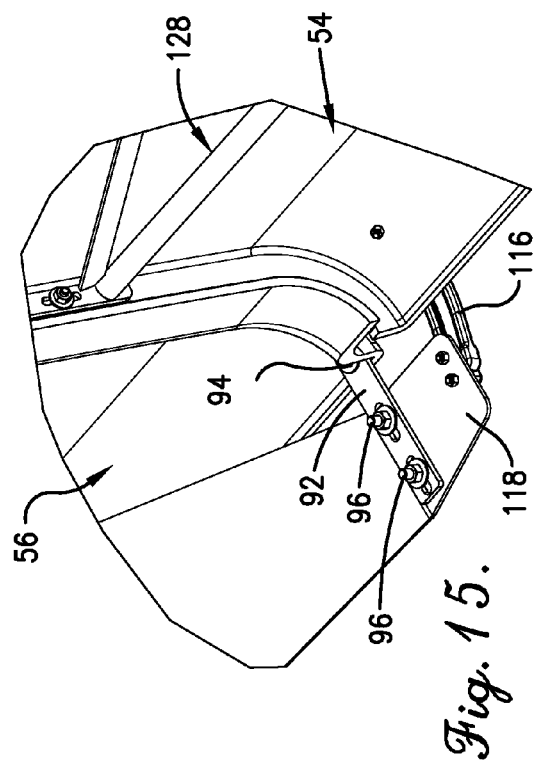

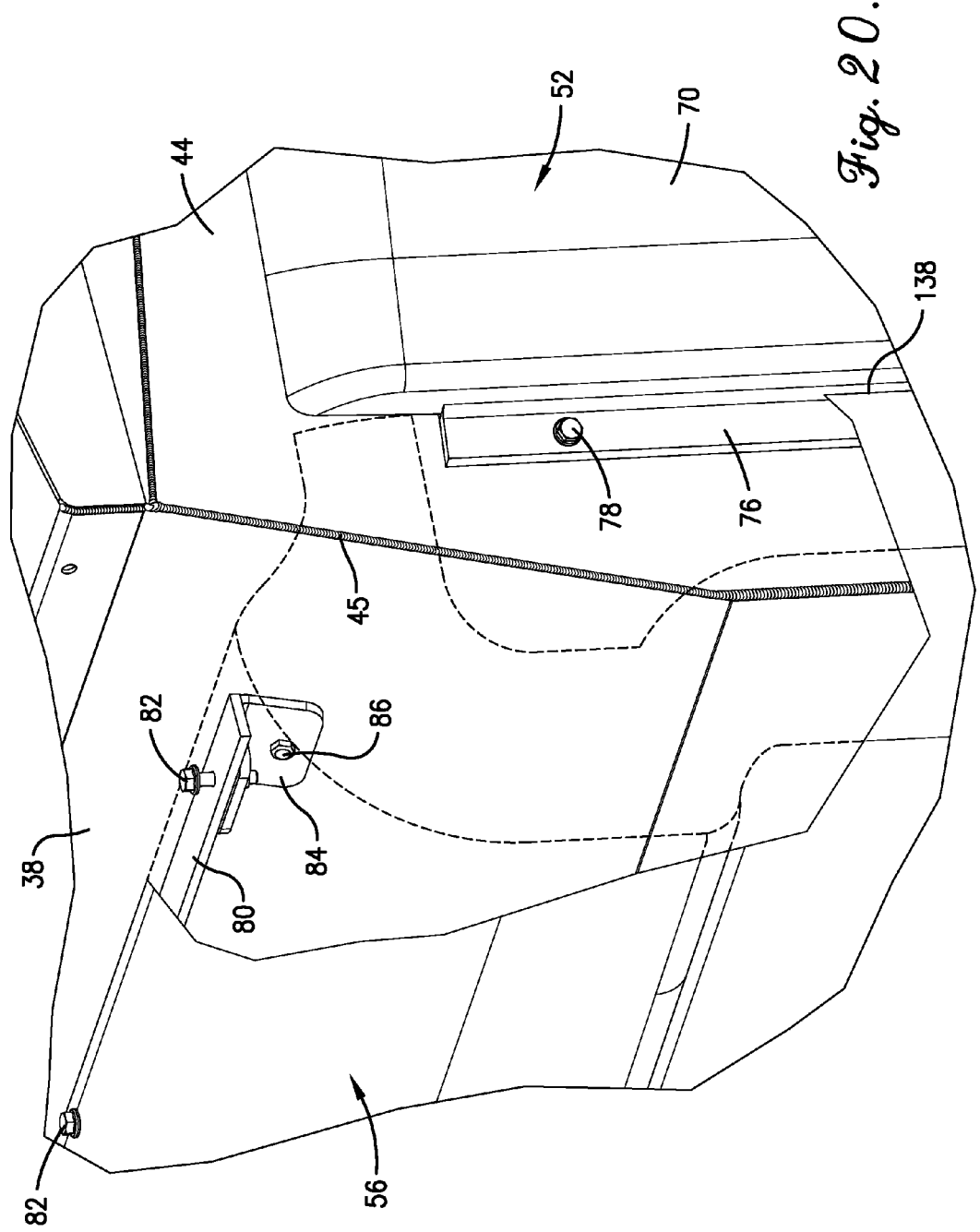

CULTIVATION AIR SEEDER WITH VISUALLY ENHANCED SEED HOPPER

TECHNICAL FIELD

The present invention relates to cultivation air seeders of the type that carry large bulk hoppers for dispensing seeds to planting tools on the machine and, more particularly, to a way of improving the appearance and functionality of such hoppers to enhance their appeal.

BACKGROUND AND SUMMARY

The large bulk seed hopper on many conventional cultivation air seeders is typically constructed from sheet metal with numerous exterior weld lines at points of intersection between adjoining walls of the hopper. Because such heavy weld lines can be rather unsightly if left in their original state, it is conventional in many instances to spend considerable time and effort laboriously grinding down and smoothing the welds to provide a more finished appearance for the hopper. Sometimes, the sheet metal may be warped or blemished, which also contributes to a lack of aesthetic appeal if not cosmetically attended to. Spending so much time on cosmetic issues not only increases manufacturing costs, but also delays completion of the finished product.

Accordingly, the present invention provides a cultivation air seeder comprising a mobile frame that supports cultivation tools for working the ground and planting tools for depositing seeds as the seeder advances. A large seed hopper on the frame holds a supply of seeds to be deposited by the planting tools. An ornamental facing covering a substantial amount of the outside of the hopper is configured to conceal unsightly exposed exterior surfaces of the hopper that otherwise reduce its aesthetic appeal. Such facing thus enhances the overall appearance of the hopper and provides a more aesthetically appealing product. Moreover, the facing is constructed to provide protection for sensitive mechanism of the seeder such as, for example, a blower used in producing one or more airstreams for transporting seeds from the hopper to the planting tools, hydraulic componentry that controls various hydraulic devices on the machine, and electronic controls that regulate and control various functions of the seeder. The facing also helps mitigate and redirect the noise of the blower to provide increased operator comfort.

BRIEF DESCRIPTION OF THE DRAWINGS

FIG. 10 is a top plan view of the isolated facing;

FIG. 11 is a fragmentary left side elevational view of the hopper illustrating in phantom lines how the left side panel of the ornamental facing covers the left side of the hopper;

FIG. 12 is an enlarged, fragmentary horizontal cross-sectional view taken substantially along line 12-12 of FIG. 11 to illustrate details of construction;

FIG. 13 is an enlarge, fragmentary horizontal cross-section view taken substantially along line 13-13 of FIG. 11 to illustrate details of construction;

FIG. 14 is a fragmentary perspective view of the exterior of the interface between the front swingable section of a side panel and the rear fixed section of the side panel, illustrating in particular the releasable retaining strap for holding the swingable section closed;

FIG. 15 is a fragmentary perspective view of the interior of the interface illustrated in FIG. 14;

FIG. 16 is a fragmentary perspective view similar to FIG. 15 but showing the retaining strap released and the front panel section partially opened;

FIG. 20 is a fragmentary left rear perspective view of the left rear corner of the hopper illustrating, by way of example, the manner in which the ornamental facing conceals unsightly weld lines on the exterior of the hopper.

DETAILED DESCRIPTION

Figure 1:
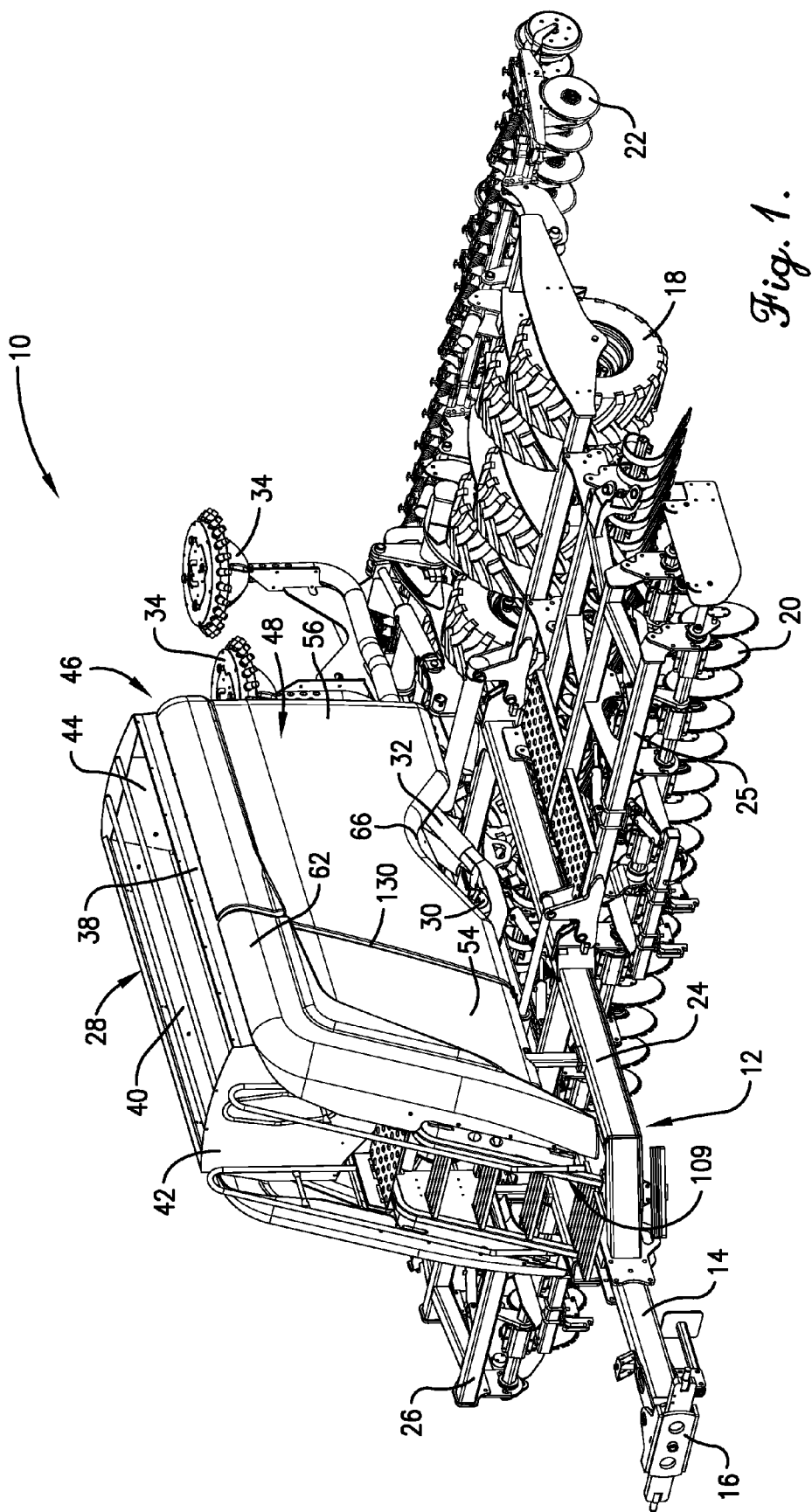
FIG. 1 is a left front perspective view of a cultivation air seeder utilizing a visually enhanced seed hopper in accordance with the principles of the present invention.
Figure 2:
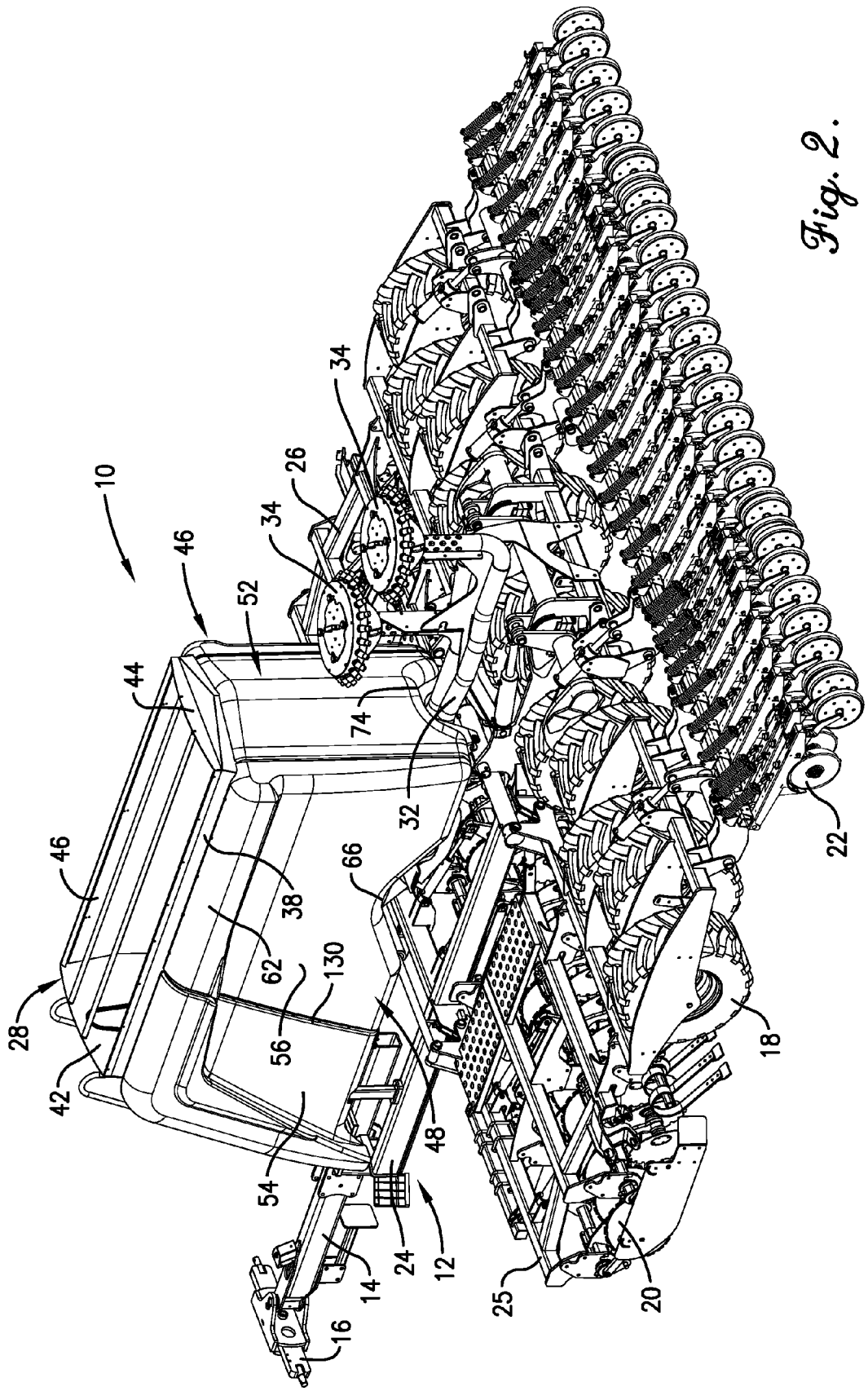
FIG. 2 is a left rear perspective view thereof.
Figure 3:
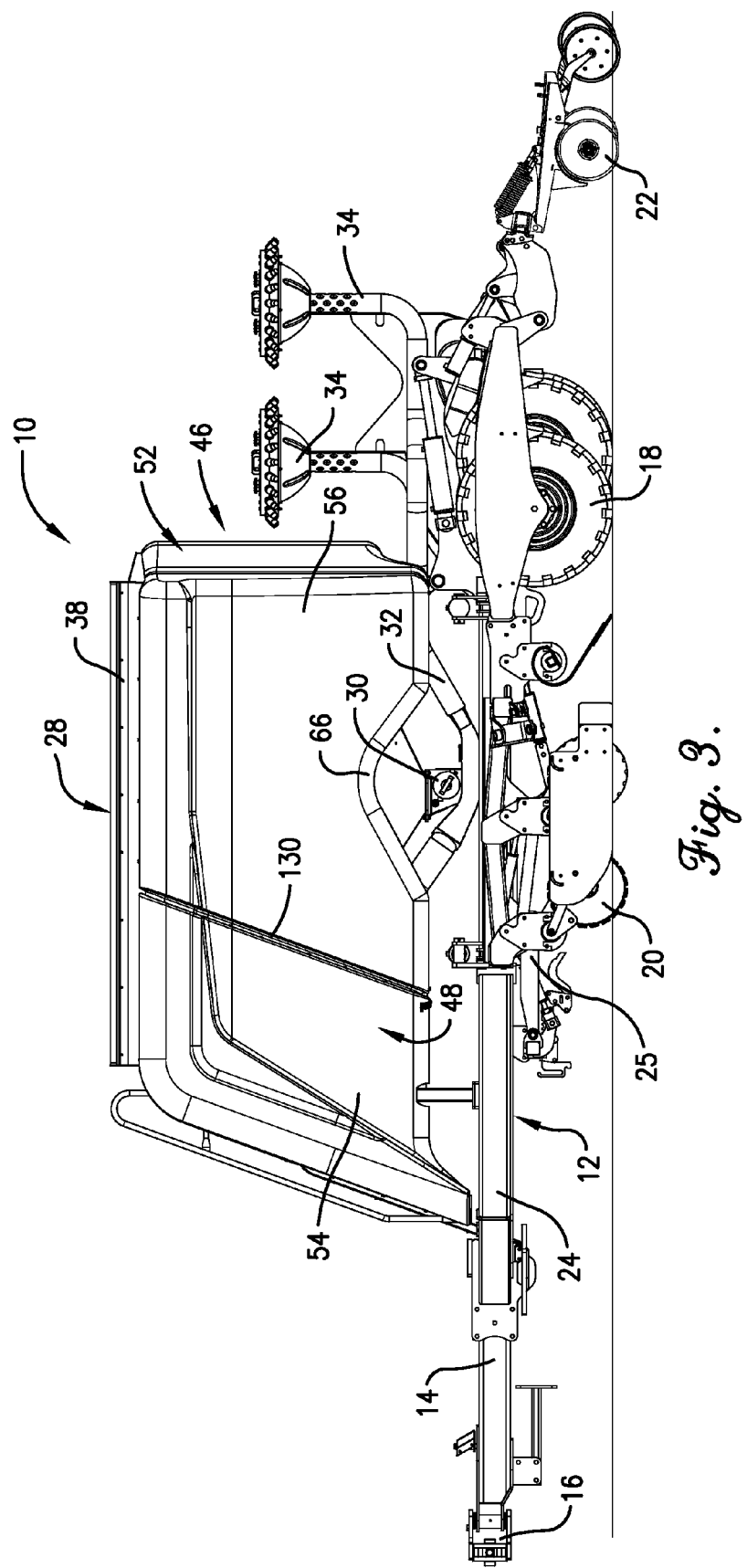
FIG. 3 is a left side elevational view thereof.

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

A cultivation air seeder in accordance with the present invention is broadly denoted by the numeral 10 and is provided with a mobile chassis or frame 12 having a tongue 14 and hitch structure 16 for connecting seeder 10 to a suitable towing tractor or other vehicle (not shown). A number of ground-engaging wheels 18 are disposed across the rear of frame 12 to support the frame for over-the-ground travel, and a set of cultivation tools 20 is supported on the frame ahead of wheels 18. A row of openers 22 of any suitable construction well known to those skilled in the art is supported across the rear of frame 12 behind wheels 18. In the illustrated embodiment, seeder 10 comprises a three-section machine, having a main frame section 24 and pair of left and right wing frame sections 25, 26 respectively, although the number of frame sections is not of importance insofar as the principles of the present invention are concerned. When applied to various parts of the machine, the terms "left" and "right" are utilized as if the machine were being viewed from the rear, looking forwardly.

Seeder 10 further comprises a large bulk hopper 28 supported on main frame section 24 for holding a supply of seeds and/or fertilizer or other particulate materials to be distributed to openers 22. Although the illustrated embodiment of the invention will be described in connection with the holding and distribution of seeds by hopper 28, it will be appreciated that the principles of the present invention are not limited to seeds and may, in fact, be utilized in connection with many different kinds of particulate materials.

A meter 30 at the bottom of hopper 28 may be utilized to dispense seeds at a metered rate into one or more conduits 32 that transport the metered seeds within an airstream toward the rear of the machine. One or more distribution towers 34 are coupled with conduits 32 downstream from meter 30 for the purpose of dividing each primary stream of seeds into a multiplicity of secondary streams that flow to the openers 22. Hoses from distribution towers 34 to openers 22 are not shown for reasons of clarity. A blower 36 (FIGS. 11, 21) adjacent the lower front end of hopper 28 supplies the transporting air for conduits 32 and the secondary hoses.

Hopper 28 may be constructed in variety of different shapes and sizes, and from a variety of different materials. In the illustrated embodiment, hopper 28 is constructed of sheet metal and presents a pair of opposite sidewalls 38, 40, a front wall 42, and a rear wall 44. Walls 38-44 present exterior surfaces of the hopper, including corners and intersections where the walls join one another. Such exterior surfaces also include weld lines or beads at the intersections of the walls (FIG. 20).

An ornamental facing 46 is provided around three sides of hopper 28 to enhance the visual aesthetics of the machine. In a preferred embodiment, facing 46 is molded from a suitable non-metallic material such as ABS plastic or other synthetic resinous material, although many different types of material can be used without departing from the principles of the present invention. While facing 46 comprises several separate pieces or parts as described hereinbelow, in one preferred embodiment such parts cooperate to produce a visually integrated unit when they are installed on the machine. It will be appreciated, however, that facing 46 may constructed as a single unit or as a number of separate and independent parts without departing from the principles of the present invention. In the illustrated embodiment, the parts that comprise facing 46 collectively present a generally U-shaped structure when installed and viewed in top plan as in FIG. 10, presenting a pair of laterally spaced apart side panels 48, 50 and a rear panel 52 that spans the distance between side panels 48, 50. Facing 46 is devoid of a panel across the front ends of side panels 48, 50 so as to render facing 46 open at the front end thereof. Facing 46 is also open at its top and bottom.

Figure 7:
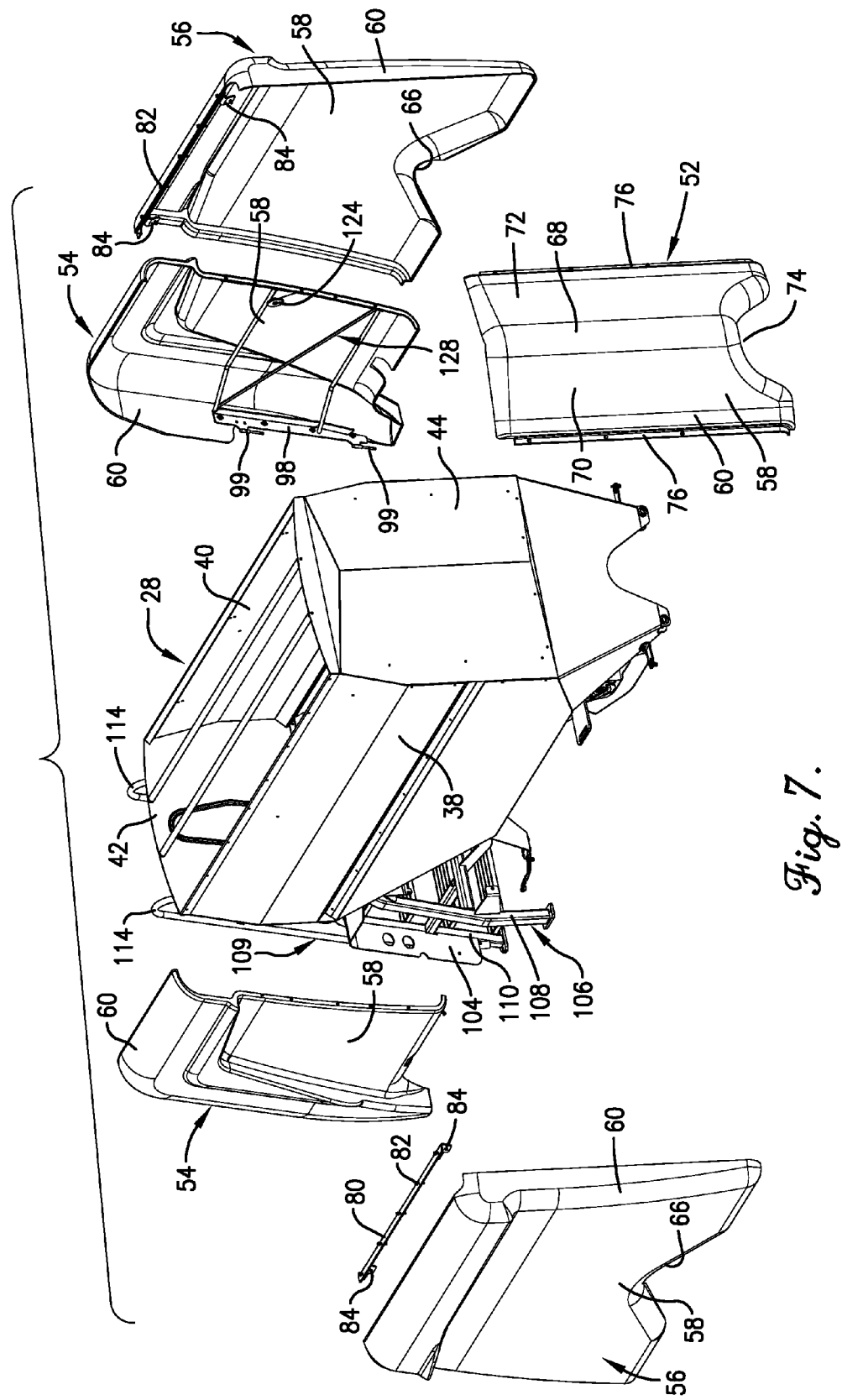
FIG. 7 is a rear exploded perspective view of the hopper and panel sections of the ornamental facing around the hopper.
Figure 8:
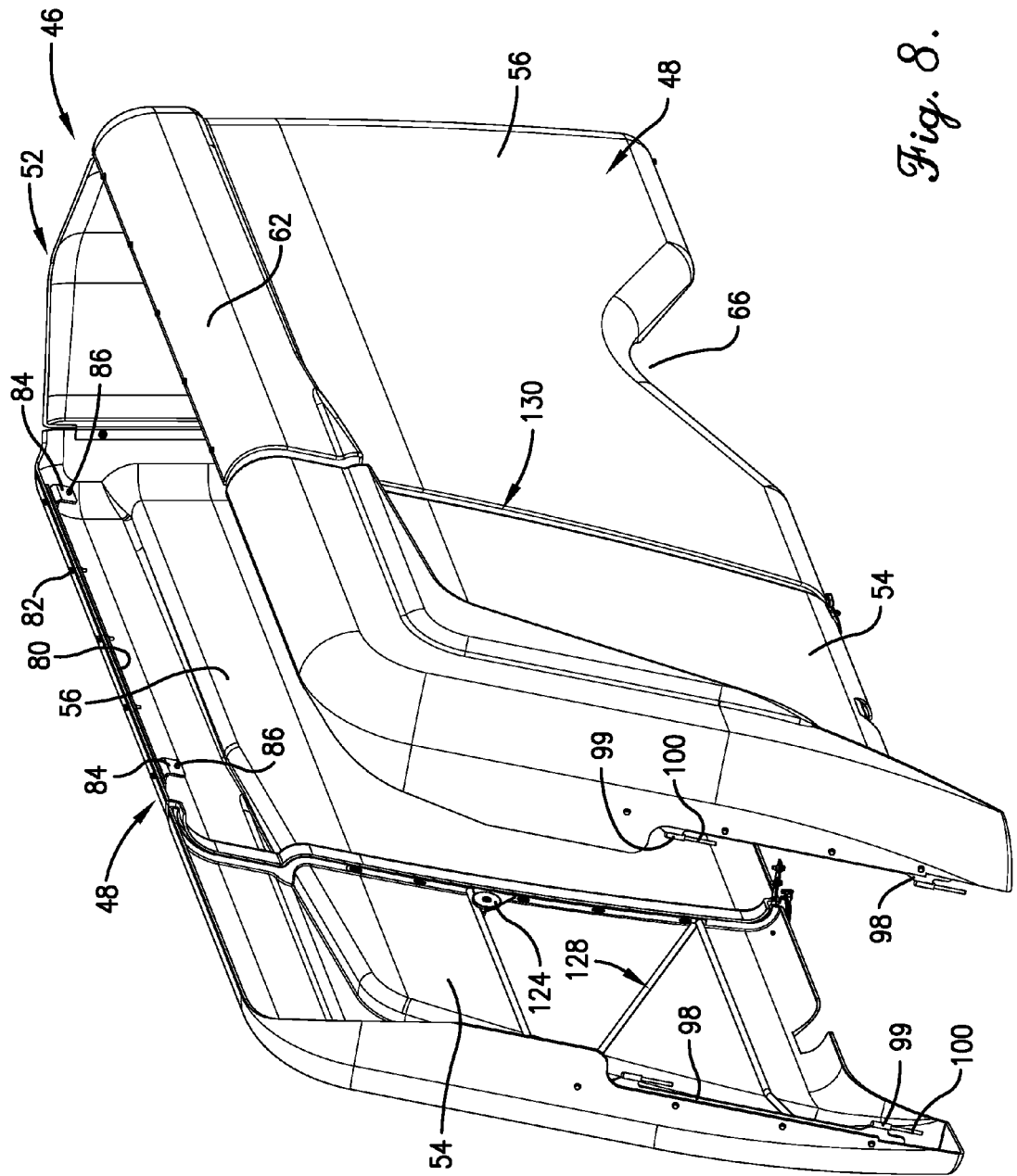
FIG. 8 is a further enlarged left front perspective view of the ornamental facing isolated from the hopper.
Figure 9:
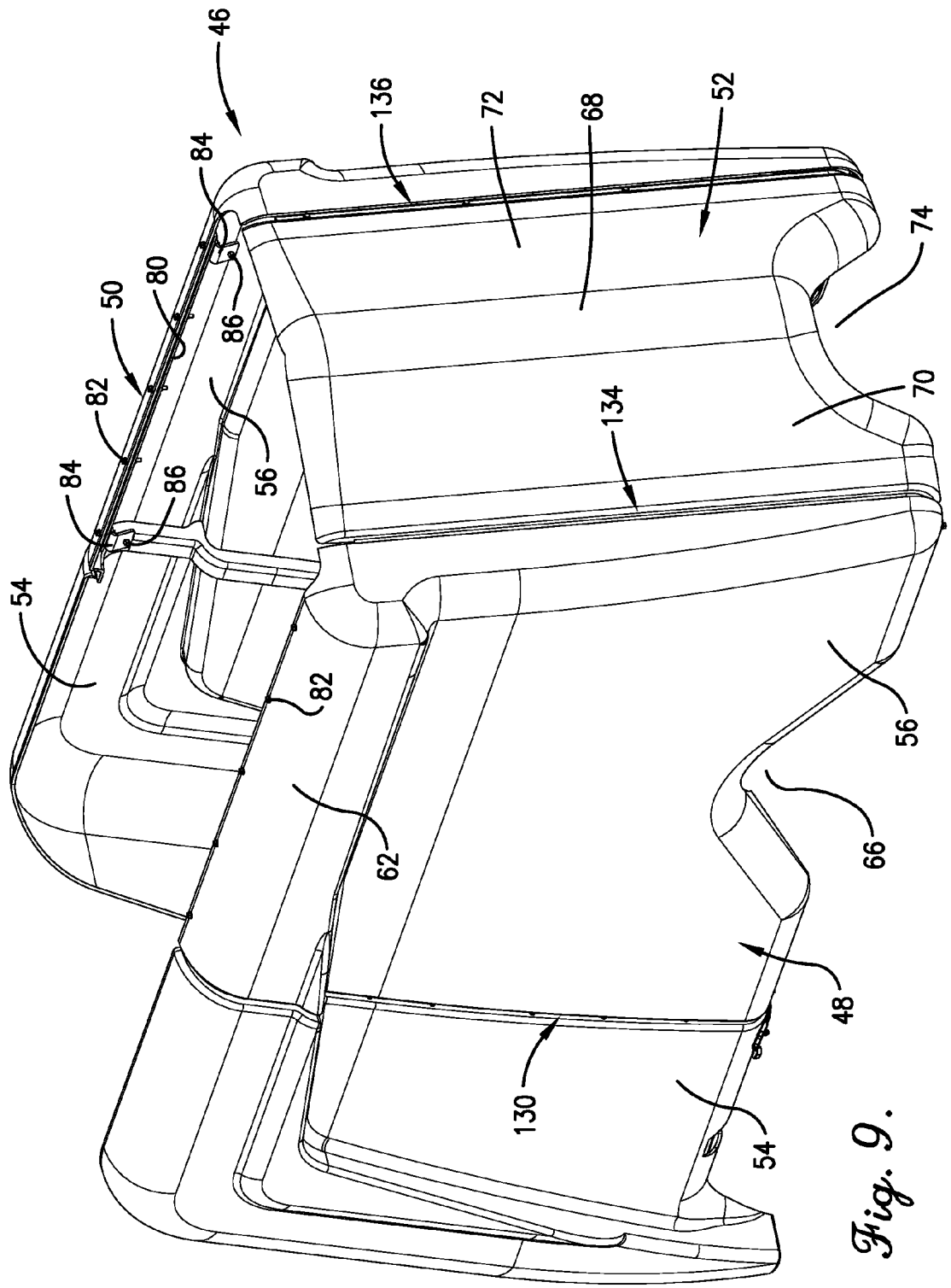
FIG. 9 is a left rear perspective view of the isolated facing.

As discussed in more detail below, each of the side panels 48, 50 is constructed in two sections, namely a front section 54 and a rear section 56. Rear panel 52 is a single section. All three of the panels 48-52 have a generally concavo-convex overall configuration (FIG. 7), presenting central web portions 58 and transversely rounded outer margins 60. The exterior of each panel is convex, while the interior is concave.

Each of the side panels 48, 50 has, along its upper margin, a horizontally extending, outwardly buldged styling shoulder 62 that runs from the rear margin of the side panel to the front margin thereof. At the front margin of the panel, shoulder 62 turns downwardly in a graceful curve and runs along the downwardly and forwardly inclined front margin to the lower front termination of the panel. Each shoulder 62 tapers from a maximum width to a minimum width along the front margin of the side panel as the lower front corner of the panel is approached. Each of the side panels 48, 50 has an inverted V-shaped notch 66 in the central region of the lower margin thereof to provide operator access to meter 30 and other structure in that area.

Rear panel 52 has a vertically extending, outwardly protruding styling ridge 68 that runs between top and bottom margins thereof to present a pair of angled, rearwardly converging web sections 70, 72 on opposite sides of ridge 68. Along its lower margin, rear panel 52 is provided with an inverted, generally U-shaped access notch 74.

Rear panel 52 is bolted directly to rear wall 44 of hopper 28. To facilitate this attachment, rear panel 52 is provided with a pair of outturned lips 76 along opposite vertical side edges of panel 52. Lips 76 lie directly against the face of hopper rear wall 44 and are secured thereto by bolts 78 (FIGS. 13, 20).

Figure 17:
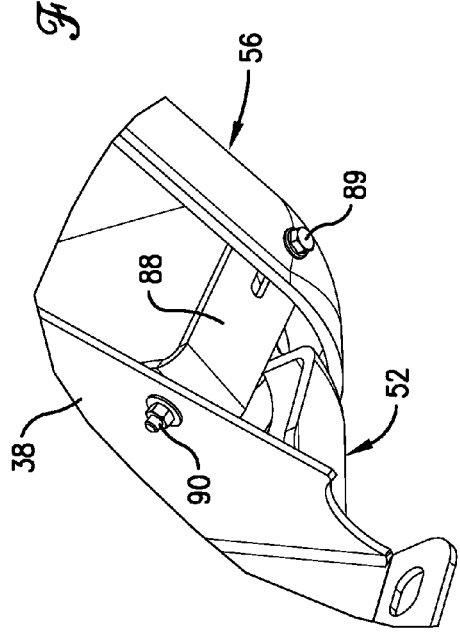
FIG. 17 is a fragmentary perspective view of a lower rear corner of one of the side panels illustrating the manner in which it is attached to the hopper.
Figure 18:
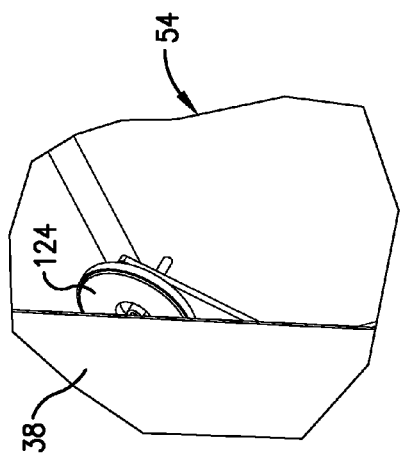
FIG. 18 is a fragmentary perspective view of the interior of one of the swingable sections of the side panels illustrating the manner in which the upper portion of the swingable section is retained in a closed condition using a magnetic latch.

As mentioned above, in the illustrated embodiment each of the ornamental side panels 48, 50 is constructed in two parts, namely a front section 54 and a rear section 56. Each rear section 56 is attached directly to the corresponding sidewall of hopper 28, and is fixed, while each front section 54 is hingedly mounted (like a door) to provide access to the area behind section 54. To effect its attachment to hopper 28, each fixed rear panel section 56 has, along its top marginal edge, a fore-and-aft extending metal strap 80 (FIGS. 7, 8, 9, 20) secured to panel section 56 by bolts 82. The two bolts 82 at opposite front and rear ends of strap 80 are attached to the top legs of inverted L-shaped brackets 84 (FIG. 20) that are fixed to the sidewall of hopper 28 by bolts 86. At its lower rear extremity, each fixed rear panel section 56 has a generally L-shaped mounting bracket 88 (FIGS. 10, 17) fixed thereto by a bolt 89. Bracket 88 is, in turn, secured to the hopper sidewall by a bolt 90. At its lower front corner, each fixed rear panel section 56 is secured to the hopper sidewall by a bracket 92 (FIGS. 10, 14, 15, 16) fastened to panel section 56 by a bolt 94 and to a portion of hopper 28 by bolts 96.

Figure 4:
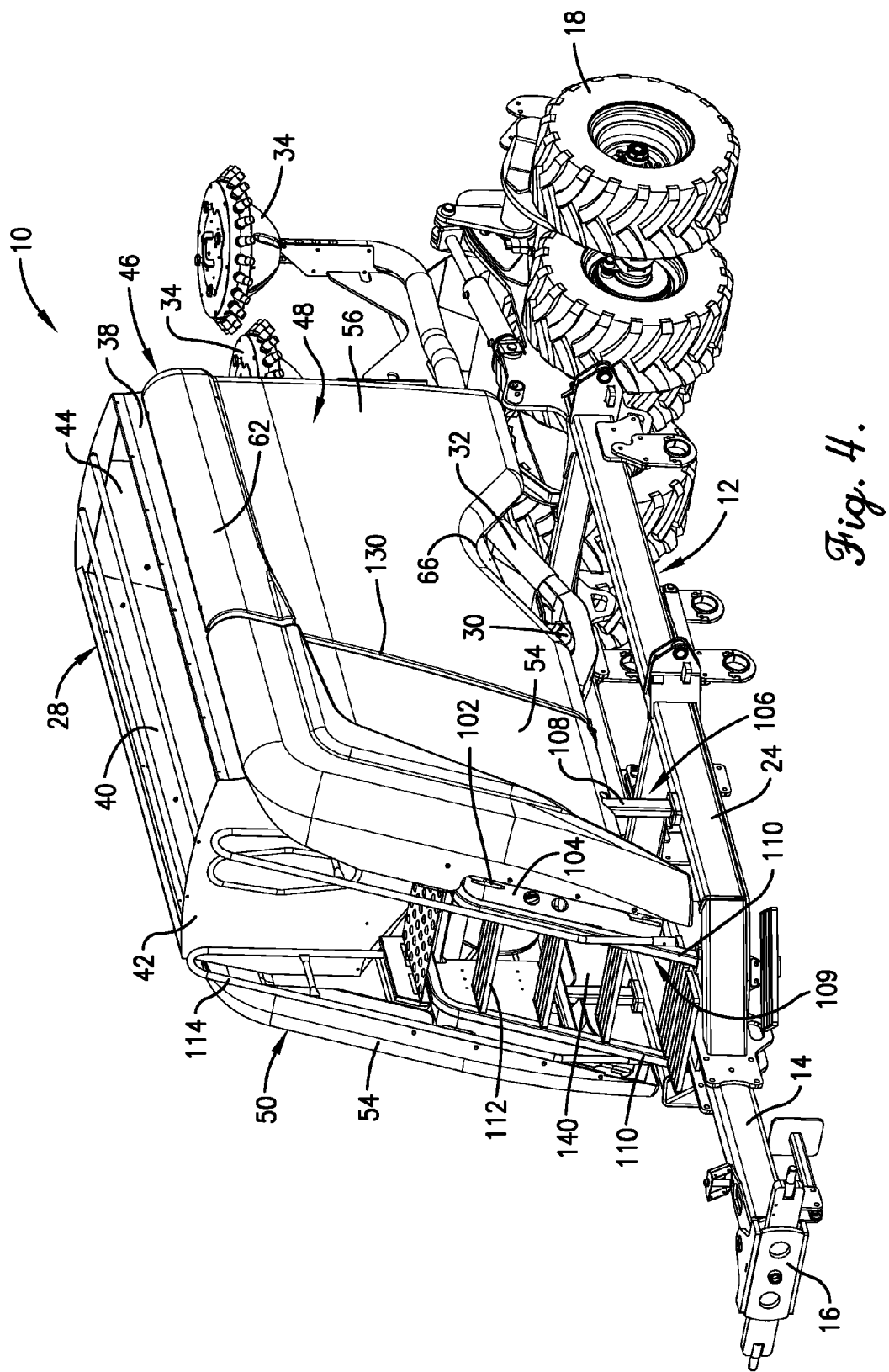
FIG. 4 is an enlarged left front perspective view of the partial seeder with wing sections, cultivation tools, and openers removed for clarity.
Figure 5:
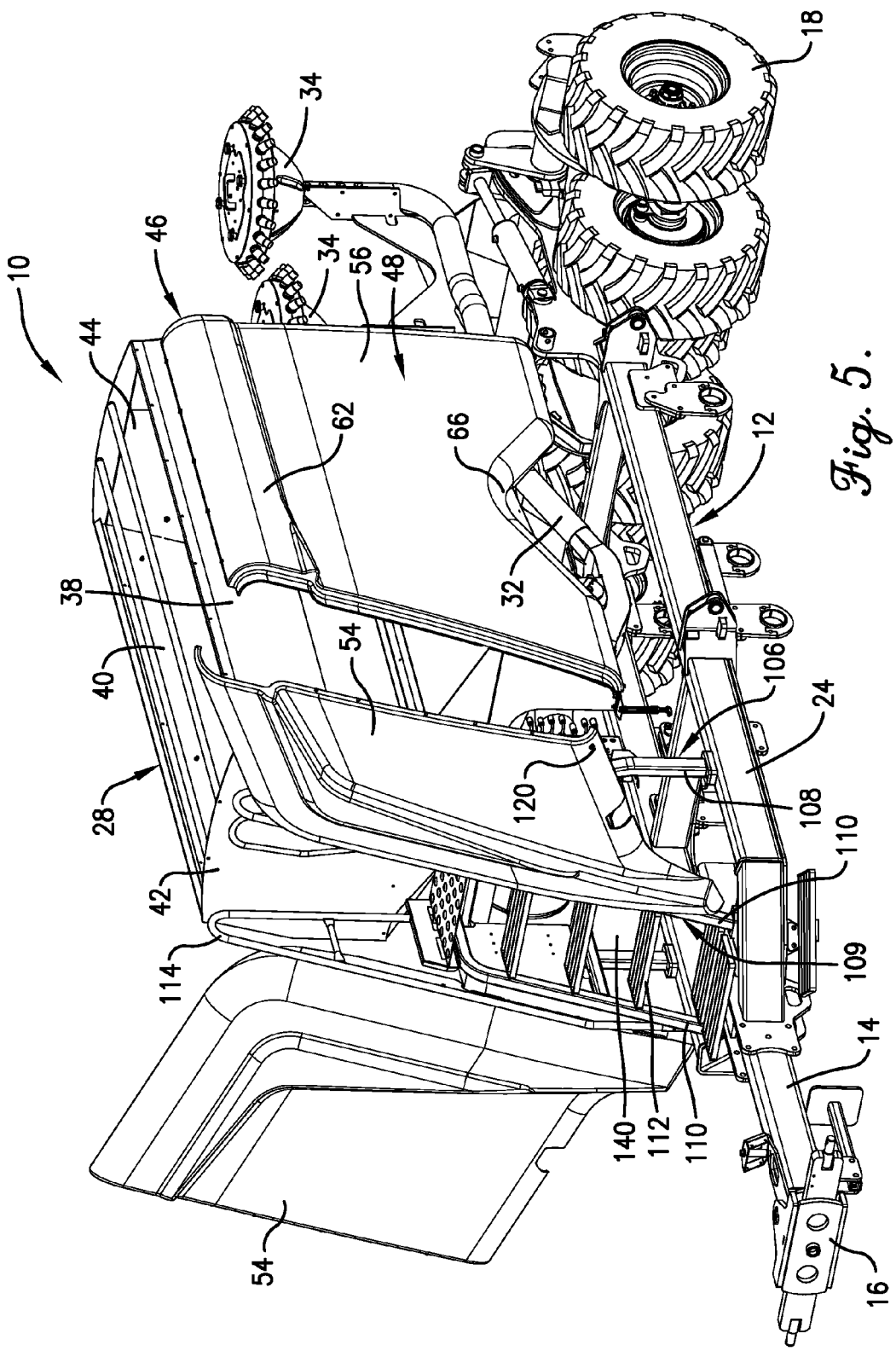
FIG. 5 is an enlarged left front perspective view similar to FIG. 4 but showing the front sections of the ornamental side panels swung open for access to equipment behind such sections.
Figure 6:
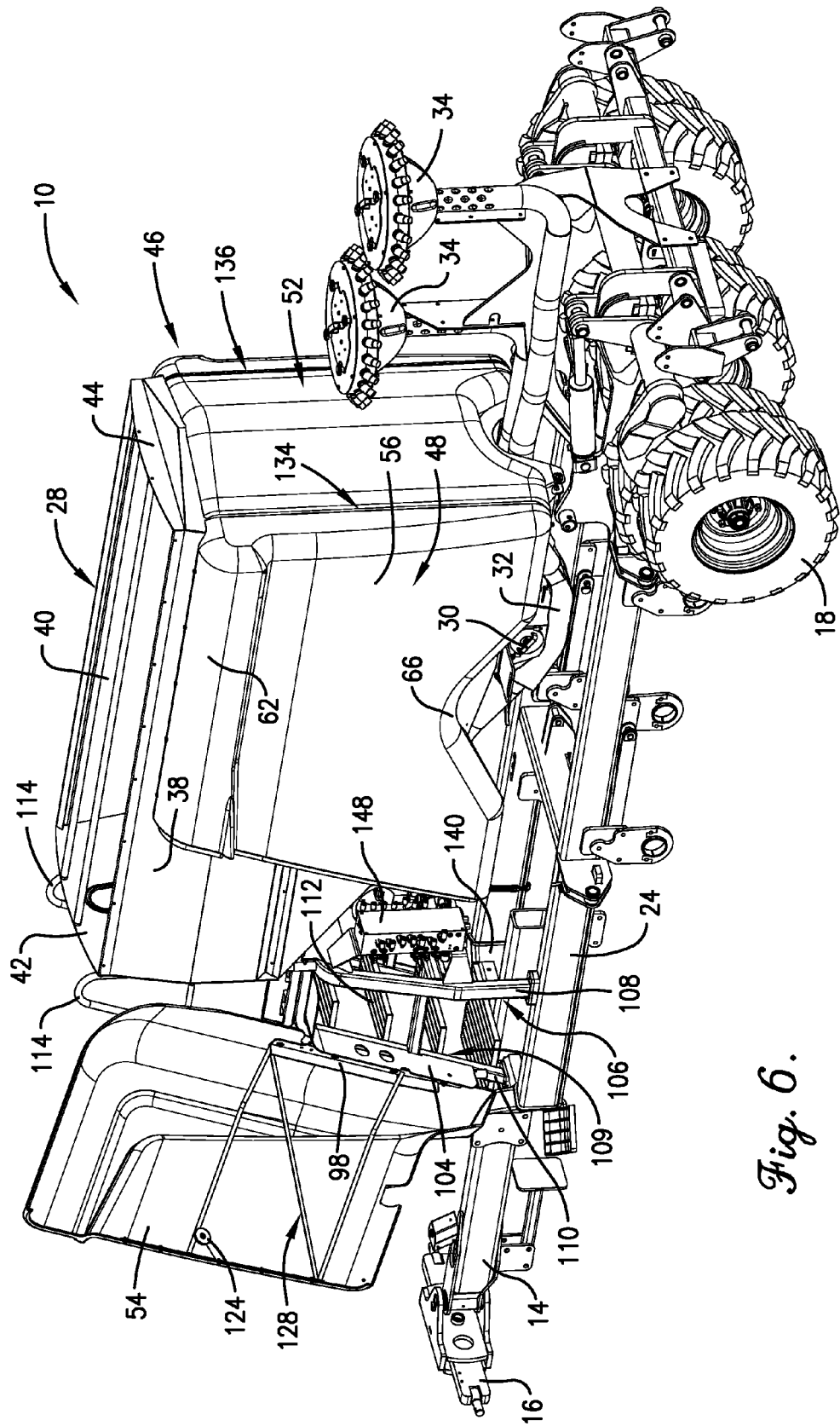
FIG. 6 is an enlarged left rear perspective view of the partial seeder with the front sections of the ornamental side panels in their open positions.
Figure 21:
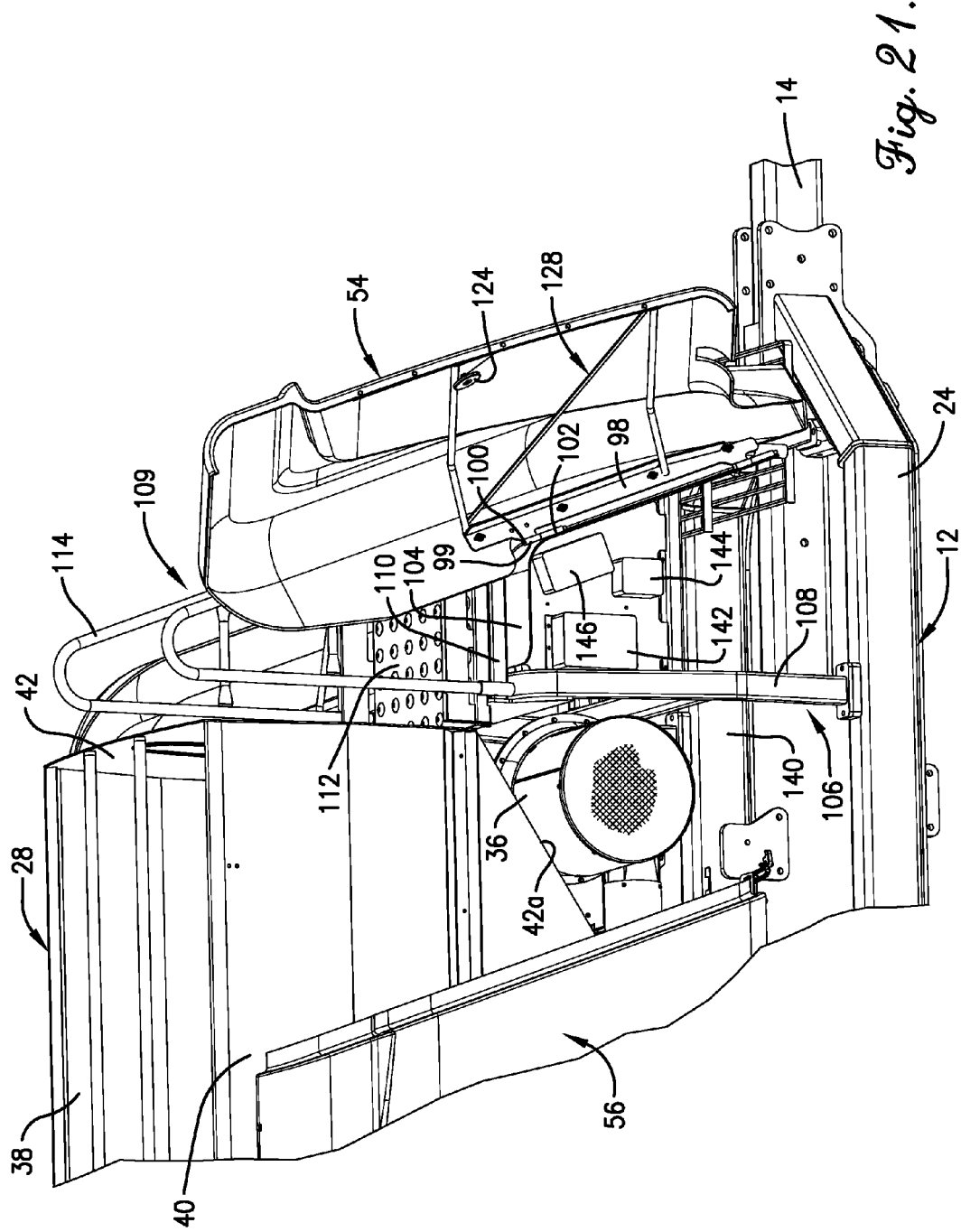
FIG. 21 is a fragmentary right side perspective view of the partial seeder with the swingable front panel section open to reveal components protected behind the panel section when it is closed.

The front, hinging panel sections 54 open and close somewhat in the nature of "gull wings" as illustrated, for example, in FIGS. 5, 6, and 21. Each front panel section 54 has an elongated hinge plate 98 (FIGS. 6, 7, 8, 10, 21) fixed to the interior surface thereof along the lower half of the front margin, the plate 98 having hinge barrels 99 that receive hinge pins 100. Pins 100 are also received within a corresponding pair of hinge barrels 102 (FIGS. 4, 21) on an elongated mounting plate 104 (FIGS. 4, 6, 7) on an upright support structure 106 (FIGS. 4, 5, 6, 7, 21) that comprises part of frame 12. As will be seen from the figures, support structure 106 comprises part of a three-dimensional, generally A-shaped weldment that includes, among other things, an upwardly arched, transversely extending rear beam 108 and an access ladder 109 formed in part by a pair of laterally spaced fore-and-aft arches 110. Ladder 109 has a series of transverse steps 112 and handrails 114.

Figure 19:
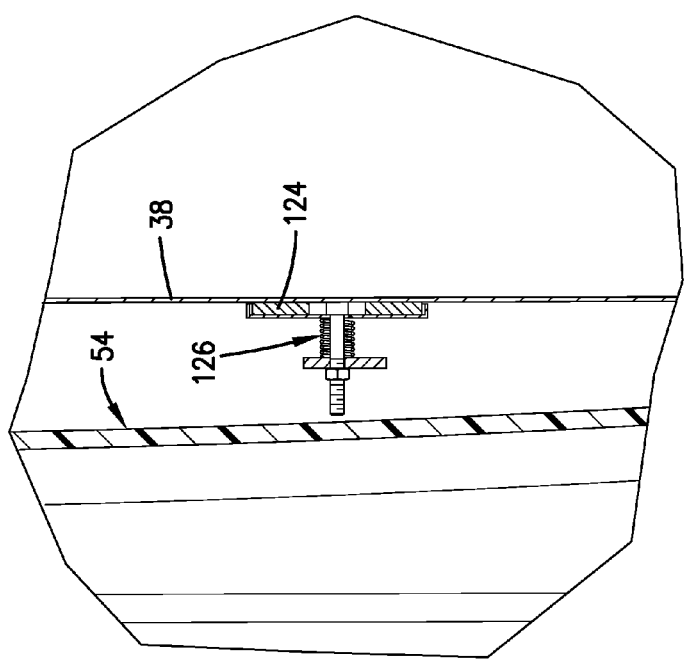
FIG. 19 is a fragmentary cross-sectional view of the swingable side panel section of FIG. 18 taken substantially along line 19-19 of FIG. 12 to reveal further details of the magnetic latch.

Thus, each of the hinging front panel sections 54 is swingable between open and closed positions about a generally upright axis (slightly rearwardly inclined) at the front extremity of front panel section 54, as defined by hinge pins 100 and hinge barrels 99, 102. In order to releasably retain front sections 54 in their closed positions, suitable releasable latches are provided. In the illustrated embodiment, such latches take the form of (for each section 54) an elastomeric strap 116 (FIGS. 14, 15, 16) secured at one end to a foot-like projection 118 on hopper 28 and at its other end to a peg 120 (FIG. 14) on the lower rear corner of front panel section 54. A T-shaped head 122 on the outer free end of strap 116 facilitates gripping of strap 116 by the operator to place the strap onto and off of peg 120. Additional latch mechanism for each hinging front panel section 54 includes a magnetic pad 124 (FIGS. 6, 7, 8, 12, 18, 19) carried by the panel section 54 at a point adjacent its rear vertical edge and approximately midway between the top and bottom margins thereof. Magnetic latch pad 124 is disposed to releasably engage the metal sidewall 38 or 40 of hopper 28 when panel section 54 is in its closed position. Each magnetic pad 124 is part of a spring-loaded plunger assembly 126 (FIGS. 12, 19) that yieldably biases the pad away from panel section 54 and thus toward the hopper sidewall when panel section 54 is in its closed position.

Each hinging front panel section 54 has a stiffening frame 128 (FIGS. 6, 7, 8, 21) on its concave interior surface to provide rigidity to the section during opening and closing movements. Frame 128 is secured to and made a part of hinge plate 98, which also helps in stiffening the panel section.

When a hinging front panel section 54 is in its closed position, the rear margin thereof forms an interface 130 with the front margin of the adjacent rear panel section 56. Due to the particular configuration of the panel sections 54, 56 in this region, a finished look is provided for the panel surfaces at interface 130. Specifically, it will be noted that the interface 130 is diagonal in that it slants upwardly and rearwardly. Moreover, each rear panel section 56 has a recessed lip 132 (FIG. 12) along the diagonal interface 130 that is recessed with respect to the exterior surface of panel section 56. The rear inclined margin of front section 54 overlies lip 132 when section 54 is closed and has an inturned edge 134 that directly overlies and faces lip 132. This enables the exterior surface of front section 54 to be substantially flush with the exterior surface of rear section 56 along interface 130 so as to provide a smooth, clean, and finished look at that location.

Each rear section 56 has a rearmost, rounded upright margin that wraps around the rear corner of hopper 28 and terminates adjacent the rear panel 52. The terminations of the rear margins of sections 56 and side margins of rear panel 52 create a pair of vertically extending interfaces 134 and 136 that are similar in appearance and construction to interfaces 130, with one exception. In this regard, while the lips 76 on opposite lateral margins of rear panel 52 are recessed with respect to adjacent exterior surfaces of rear panel 52, the proximal edge 138 along the margin of each rear section 56 is not inturned, although it does overlie the corresponding lip 76 all along the length of the latter. Consequently, adjacent exterior surfaces on the rear panel sections 56 and rear panel 52 are substantially flush with one another to provide a smooth, clean, and finished look to that area.

It will be appreciated that the hinging front panel sections 54 overlie and cover a front portion of hopper 28. However, in addition front panel sections 54 also extend forwardly beyond front wall 42 of hopper 28 into overlapping relationship with the weldment structure 106 and ladder 109. Accordingly, between ladder 109 and front wall 42 of hopper 28 is defined a protected space 140 (FIGS. 4, 5, 6, 11, 21) that is bounded at its sides by front panel sections 54 when they are closed. As illustrated in FIG. 11, front wall 42 of hopper 28 has a lower portion 42a that slopes downwardly and rearwardly to define part of the rear boundary of protected space 140.

Within such protected space 140 are disposed several components that need shielding from environmental conditions. One such component is the blower 36 (FIGS. 11, 21) that is tucked under the inclined front wall portion 42a. Additional such components comprise electronic boxes 142, 144, and 146 (FIG. 21) located on the right side of the machine generally behind ladder 109. An additional such component comprises a valve block 148 (FIG. 6) on the left side of the machine behind arch 108 of weldment structure 106.

It will be appreciated from the foregoing that the ornamental facing 46 of the present invention provides a way of enhancing the aesthetic appeal of hopper 28 without in any way detracting from its functionality or serviceability. Although one preferred configuration and styling for facing 46 has been illustrated in the drawings, many variations on the look of facing 46 could be implemented without departing from the principles of the present invention. Furthermore, the amount of surface area of the hopper covered by the ornamental facing 46 is somewhat a matter of personal preference, although it is preferred that a substantial amount be covered, i.e., at least fifty percent. Depending upon the amount of surface area to be covered, the number and arrangement of ornamental panels utilized in the practice of the present invention may vary from that of the illustrated embodiment. The ornamental facing 46 of the present invention is particularly beneficial in connection with hoppers of large capacity, such as in the range of from twenty-five to one hundred seventeen bushels (876-4100 liters).

In addition to the sleek lines and contours provided by facing 46, unsightly weld lines, such as weld line 45 at the intersection of hopper sidewall 38 and hopper rear wall 44 (FIG. 20), can be completely concealed by facing 46. Thus, the significant labor associated with prior machines involving grinding down weld lines and otherwise applying other finishing touches to the hopper can be completely avoided. By having environmentally sensitive components such as the blower 36, electronic boxes 142, 144, 146, and valve block 148 located within protected space 140 behind front panel sections 54, their useful life is extended and their reliability is increased. Front panel sections 54 are also effective in reducing much of the noise experienced by the operator from blower 36 by directing it away from the operator. Moreover, by having front panel sections 54 hingedly attached, rather than fixed in place, the operator is assured of quick and easy access to the blower, electrical components, and the valve block if the need should ever arise.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A cultivation air seeder comprising:
   a mobile frame supporting cultivation tools for working the ground and planting tools for depositing seeds into the ground as the seeder moves along a path of travel;
   a seed hopper mounted on said frame for holding a supply of seeds to be deposited by the planting tools,
   said hopper having a capacity of at least twenty-five bushels and further having an exterior that includes a plurality of exposed exterior surfaces; and
   ornamental facing covering at least a substantial amount of said exposed exterior surfaces for enhancing the appearance of the hopper,
   said ornamental facing having a different configuration than said exterior of the hopper and including a plurality of rounded contours.

2. A cultivation air seeder as claimed in claim 1,
   said hopper including a plurality of intersecting walls and weld lines at intersections between the walls,
   said exposed exterior surfaces of the hopper including at least certain of said walls and weld lines.

3. A cultivation air seeder as claimed in claim 2,
   said walls of the hopper including a pair of opposite sidewalls, a rear wall, and a front wall with respect to the normal direction of travel of the seeder, said facing including side ornamental panels covering said sidewalls of the hopper.

4. A cultivation air seeder as claimed in claim 3,
said facing further including a rear ornamental panel covering said rear wall.

5. A cultivation air seeder comprising:
a mobile frame supporting cultivation tools for working the ground and planting tools for depositing seeds into the ground as the seeder moves along a path of travel;
a seed hopper mounted on said frame for holding a supply of seeds to be deposited by the planting tools,
said hopper having a capacity of at least twenty-five bushels and further having a plurality of exposed exterior surfaces; and
ornamental facing covering at least a substantial amount of said exposed exterior surfaces for enhancing the appearance of the hopper,
said hopper including a plurality of intersecting walls and weld lines at intersections between the walls,
said exposed exterior surfaces of the hopper including at least certain of said walls and weld lines,
said walls of the hopper including a pair of opposite sidewalls, a rear wall, and a front wall with respect to the normal direction of travel of the seeder,
said facing including side ornamental panels covering said sidewalls of the hopper,
said facing further including a rear ornamental panel covering said rear wall,
said front wall of the hopper being devoid of a front ornamental panel covering the same.

6. A cultivation air seeder comprising:
a mobile frame supporting cultivation tools for working the ground and planting tools for depositing seeds into the ground as the seeder moves along a path of travel;
a seed hopper mounted on said frame for holding a supply of seeds to be deposited by the planting tools,
said hopper having a capacity of at least twenty-five bushels and further having a plurality of exposed exterior surfaces; and
ornamental facing covering at least a substantial amount of said exposed exterior surfaces for enhancing the appearance of the hopper,
said hopper including a plurality of intersecting walls and weld lines at intersections between the walls,
said exposed exterior surfaces of the hopper including at least certain of said walls and weld lines,
said walls of the hopper including a pair of opposite sidewalls, a rear wall, and a front wall with respect to the normal direction of travel of the seeder,
said facing including ands covering said sidewalk of the hopper,
at least one of said side ornamental panels including a fixed rear section and a hinging front section,
said hinging front section being swingable between a closed position covering a corresponding portion of the hopper sidewall and an open position uncovering such corresponding portion of the hopper sidewall.

7. A cultivation air seeder as claimed in claim 6,
said frame including a support in front of said front wall of the hopper,
said hinging front section of said at least one side ornamental panel being hingedly attached to said support for swinging movement between said closed and open positions about a generally upright axis.

8. A cultivation air seeder as claimed in claim 7,
said fixed rear section of said at least one side ornamental panel being attached to said sidewall of the hopper.

9. A cultivation air seeder as claimed in claim 8,
said facing further including a rear ornamental panel attached to said rear wall of the hopper.

10. A cultivation air seeder as claimed in claim 6,
said hinging front section being swingable about a generally upright axis.

11. A cultivation air seeder as claimed in claim 10,
said upright axis being disposed at a front extremity of said front section of the side ornamental panel with respect to said normal direction of travel of the seeder.

12. A cultivation air seeder comprising:
a mobile frame supporting cultivation tools for working the ground and planting tools for depositing seeds into the ground as the seeder moves along a path of travel;
a seed hopper mounted on said frame for holding a supply of seeds to be deposited by the planting tools,
said hopper having a capacity of at least twenty-five bushels and further having a plurality of exposed exterior surfaces; and
ornamental facing covering at least a substantial amount of said exposed exterior surfaces for enhancing the appearance of the hopper,
said hopper including a plurality of intersecting walls and weld lines at intersections between the walls,
said exposed exterior surfaces of the hopper including at least certain of said walls and weld lines,
said walls of the hopper including a pair of opposite sidewalls, a rear wall, and a front wall with respect to the normal direction of travel of the seeder,
said facing including side ornamental panels covering said sidewalls of the hopper,
said side ornamental panels extending forwardly beyond said front wall of the hopper to present a pair of laterally spaced extended panel sections defining a protected space therebetween,
further comprising a blower for generating an air stream used in transporting seeds from the hopper to the planting tools,
said blower being located within said protected space between said extended panel sections.

13. A cultivation air seeder as claimed in claim 12,
further comprising electrical components located within said protected space between said extended panel sections.

14. A cultivation air seeder comprising:
a mobile frame supporting cultivation tools for working the ground and planting tools for depositing seeds into the ground as the seeder moves along a path of travel;
a seed hopper mounted on said frame for holding a supply of seeds to be deposited by the planting tools,
said hopper having a capacity of at least twenty-five bushels and further having a plurality of exposed exterior surfaces; and
ornamental facing covering at least a substantial amount of said exposed exterior surfaces for enhancing the appearance of the hopper,
further comprising a blower for generating an air stream used in transporting seeds from the hopper to the planting tools,
said ornamental facing being configured to define a protected space between a pair of panels of the facing,
said blower being disposed within said protected space.

15. A cultivation air seeder as claimed in claim 14,
said pair of panels comprising a pair of side ornamental panels on opposite sides of the hopper that extend forwardly beyond a front end of the hopper with respect to the normal direction of forward travel of the seeder to present a pair of extended panel sections, said protected space being located between said extended panel sections.

16. A cultivation air seeder as claimed in claim 1, said hopper being constructed from sheet metal material, said ornamental facing being constructed from a non-metallic material.

17. A cultivation air seeder comprising:

a mobile frame supporting cultivation tools for working the ground and planting tools for depositing seeds into the ground as the seeder moves along a path of travel;

a seed hopper mounted on said frame for holding a supply of seeds to be deposited by the planting tools, said hopper having a capacity of at least twenty-five bushels and further having a plurality of exposed exterior surfaces; and ornamental facing covering at least a substantial amount of said exposed exterior surfaces for enhancing the appearance of the hopper, said ornamental facing including a plurality of generally upright ornamental panels, each of said panels being of generally concavo-convex overall configuration with a generally convex exterior and a generally concave interior, each panel having a main web portion and transversely rounded outer margins.

18. A cultivation air seeder as claimed in claim 17, the outer margins of at least a pair of said panels being disposed adjacent one another to present an interface between the adjacent panels, said interface comprising a lip on the outer margin of one panel and an edge on the outer margin of the other panel that overlies said lip, said lip being recessed to render exterior surfaces of the adjacent panels generally flush with one another along said interface.

19. A cultivation air seeder as claimed in claim 17, said plurality of upright panels including a pair of fore-and-aft extending side panels on opposite sides of the hopper, at least one of said side panels comprising a fixed rear section and a hinging front section, said hinging front section being swingable between a closed position covering a corresponding portion of a sidewall of the hopper and an open position uncovering such corresponding portion of the hopper sidewall, an outer margin of said front section being disposed adjacent an outer margin of the rear section to present an interface when the front section is in said closed position, said interface comprising a lip on one section and an inturned edge on the other section that overlies said lip, said lip being recessed to render exterior surfaces of the adjacent sections generally flush with one another along said interface when the front section is in said closed position.

20. A cultivation air seeder comprising:

a mobile frame supporting cultivation tools for working the ground and planting tools for depositing seeds into the ground as the seeder moves along a path of travel;

a seed hopper mounted on said frame for holding a supply of seeds to be deposited by the planting tools, said hopper having a capacity of at least twenty-five bushels and further having a plurality of exposed exterior surfaces; and ornamental facing covering at least a substantial amount of said exposed exterior surfaces for enhancing the appearance of the hopper, said facing being generally U-shaped when viewed in top plan having a pair of upright, laterally spaced apart, fore-and-aft extending side ornamental panels, an upright, transversely extending rear ornamental panel extending between rear ends of the side ornamental panels with respect to the normal direction of forward travel of the seeder, an open top, and an open bottom.

21. A cultivation air seeder as claimed in claim 20, said side ornamental panels each having an access notch in a lower margin thereof to facilitate access to the hopper.

22. A cultivation air seeder as claimed in claim 20, said rear ornamental panel having an access notch in a lower margin thereof to facilitate access to the hopper.

23. A cultivation air seeder as claimed in claim 20, said side ornamental panels and said rear ornamental panel being separately attached to the hopper.

24. A cultivation air seeder as claimed in claim 20, each of said panels being of generally concavo-convex overall configuration with a generally convex exterior and a generally concave interior, each panel having a main web portion and transversely rounded outer margins.

25. A cultivation air seeder as claimed in claim 24, each of said panels being molded from a synthetic resinous material.

26. A cultivation air seeder as claimed in claim 24, each of said side ornamental panels having an outwardly bulged styling shoulder extending forwardly from the rear margin along the upper margin and then downwardly along the front margin of the panel.

27. A cultivation air seeder as claimed in claim 26, said styling shoulder on each side ornamental panel tapering from a maximum width toward a minimum width along the front margin of the panel as a lower extremity of the panel is approached.

28. A cultivation air seeder as claimed in claim 27, each of said side ornamental panels including a fixed rear section and a hinging front section, said hinging front section being swingable between a closed position covering a corresponding portion of the hopper sidewall and an open position uncovering such corresponding portion of the hopper sidewall.

29. A cultivation air seeder as claimed in claim 28, said frame including a support in front of a front wall of the hopper, said hinging front section of said side ornamental panel being hingedly attached to said support for swinging movement between said closed and open positions about a generally upright axis.

30. A cultivation air seeder as claimed in claim 29, said fixed rear section of each side ornamental panel being attached to a sidewall of the hopper.

31. A cultivation air seeder as claimed in claim 30, said facing further including a rear ornamental panel attached to a rear wall of the hopper.

32. A cultivation air seeder as claimed in claim 20, said rear ornamental panel having a centrally disposed, upright, outwardly protruding styling ridge extending between top and bottom margins thereof to present a pair of outwardly and rearwardly converging panel sections on opposite sides of the ridge.

33. An air seeder comprising:

a mobile frame;

a bulk seed hopper supported on the frame and having a capacity of at least twenty five bushels, said hopper having a plurality of metallic walls presenting exterior surfaces; and a non-metallic ornamental facing covering at least a substantial amount of said exterior surfaces to enhance the appearance of the hopper, said facing comprising a pair of side ornamental panels overlying opposite sidewalls of the hopper and a rear ornamental panel overlying a rear wall of the hopper, at least one of said side ornamental panels including a fixed rear section and a hinging front section, said hinging front section being swingable between a closed position covering a corresponding portion of the hopper sidewall and an open position uncovering such corresponding portion of the hopper sidewall.

\* \* \* \* \*